(12) United States Patent
Lang et al.

(10) Patent No.: US 11,925,895 B2
(45) Date of Patent: Mar. 12, 2024

(54) METHOD AND DEVICE FOR COOLING A SYNTHESIS GAS FLOW

(71) Applicant: LINDE GMBH, Pullach (DE)

(72) Inventors: Martin Lang, Munich (DE); Alexander Hirsch, Schondorf (DE)

(73) Assignee: Linde GmbH, Pullach (DE)

( * ) Notice: Subject to any disclaimer, the term of this patent is extended or adjusted under 35 U.S.C. 154(b) by 610 days.

(21) Appl. No.: 17/259,763

(22) PCT Filed: Jul. 4, 2019

(86) PCT No.: PCT/EP2019/025211
§ 371 (c)(1),
(2) Date: Jan. 12, 2021

(87) PCT Pub. No.: WO2020/015854
PCT Pub. Date: Jan. 23, 2020

(65) Prior Publication Data
US 2021/0354073 A1    Nov. 18, 2021

(30) Foreign Application Priority Data

Jul. 19, 2018  (DE) .......................... 102018005695.4

(51) Int. Cl.
*B01D 53/00* (2006.01)
*B01D 19/00* (2006.01)
(Continued)

(52) U.S. Cl.
CPC ....... *B01D 53/002* (2013.01); *B01D 19/0015* (2013.01); *B01D 19/0036* (2013.01); *C01B 3/02* (2013.01); *C10K 1/003* (2013.01); *B01D 2256/16* (2013.01); *B01D 2256/20* (2013.01); *B01D 2257/304* (2013.01); *B01D 2257/504* (2013.01); *B01D 2257/80* (2013.01);
(Continued)

(58) Field of Classification Search
None
See application file for complete search history.

(56) References Cited

U.S. PATENT DOCUMENTS

2005/0066813 A1   3/2005  Dunn
2013/0097929 A1   4/2013  Pham et al.

FOREIGN PATENT DOCUMENTS

EP    2103569 A2 *  9/2009  ............. C01B 3/384
EP    2103569 A2     9/2009
(Continued)

OTHER PUBLICATIONS

EP3124433A1_ENG (Espacenet machine translation of Tadiello) (Year: 2017).*

*Primary Examiner* — Gabriel E Gitman
(74) *Attorney, Agent, or Firm* — Millen, White, Zelano & Branigan, P.C.; Brion P. Heaney

(57) ABSTRACT

The invention relates to a method and to a device for performing a process (P) having at least one heat-consuming process step (F). A first fluid (2), which arises in the process and contains acid gases and water vapor, is cooled indirectly against a second fluid (7), an acidic condensate thus being formed. The invention is characterized in that the first fluid (2) is cooled in at least two successive steps (E1, E2), between which heat for use in the heat-consuming process step (V) is indirectly drawn from the second fluid (10).

14 Claims, 3 Drawing Sheets

Figure 1:
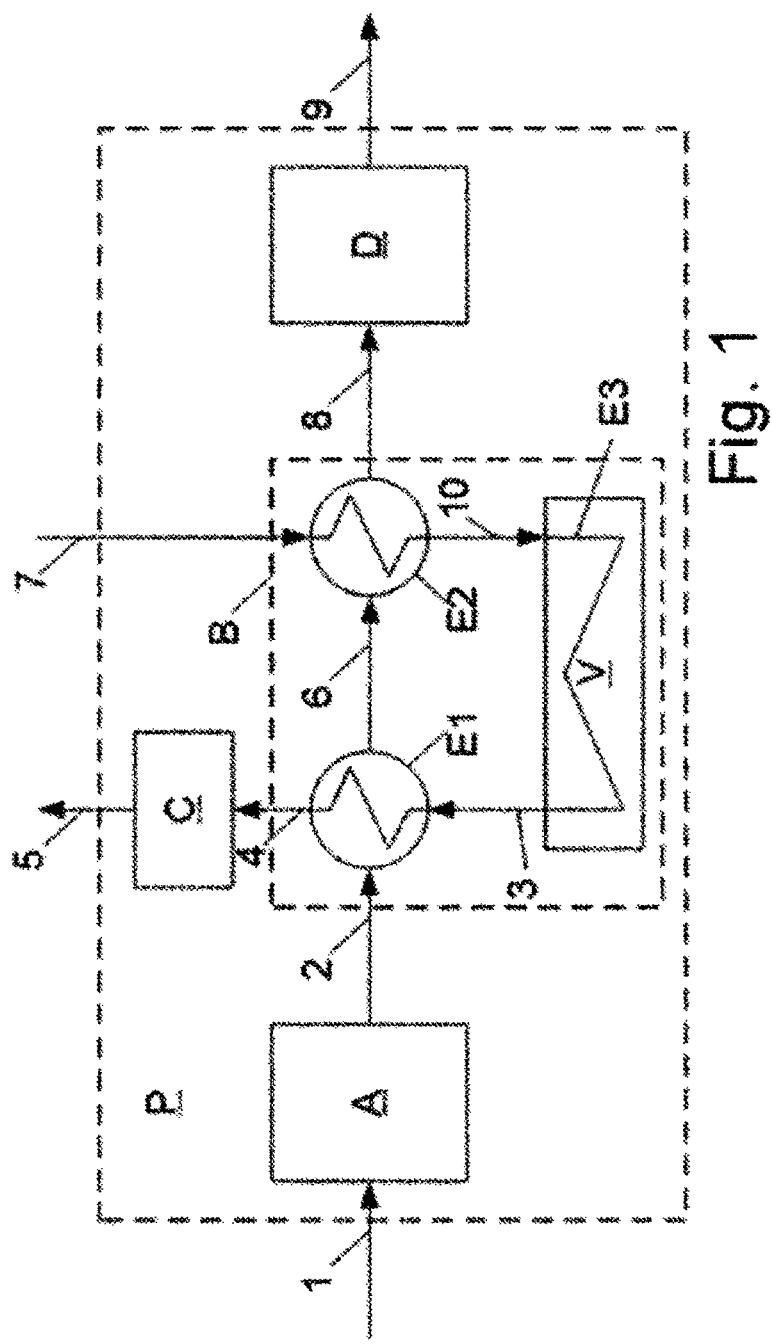

(51) Int. Cl.
*C01B 3/02* (2006.01)
*C10K 1/00* (2006.01)

(52) U.S. Cl.
CPC ............. *C01B 2203/0475* (2013.01); *C01B 2203/0485* (2013.01); *C01B 2203/0495* (2013.01); *C01B 2203/0894* (2013.01); *C01B 2203/1623* (2013.01)

(56) References Cited

FOREIGN PATENT DOCUMENTS

| | | | | |
|---|---|---|---|---|
| EP | 3124433 A1 * | 2/2017 | ............... | C01B 3/50 |
| WO | 90/06282 A1 | 6/1990 | | |

* cited by examiner

METHOD AND DEVICE FOR COOLING A SYNTHESIS GAS FLOW

The invention relates to a method for performing a process having at least one heat-consuming process step. A first fluid, which arises in the process and contains acid gases and water vapor, is cooled indirectly against a second fluid, an acidic condensate thus being formed.

The invention also relates to a device for carrying out the method according to the invention.

That a fluid is indirectly cooled against another fluid is to be understood to mean that heat is transferred between the two fluids via a heat-conductive wall, which separates both fluids from one another and prevents mass transfer.

Methods and devices of the generic type are used, for example, in the thermochemical generation of synthesis gas or hydrogen. Here, a carbon or hydrocarbon-containing feedstock is converted, for example by steam reforming or partial oxidation and water-gas shift, to a hot raw synthesis gas containing water vapor and acid gases, which is subsequently cooled in order to condense out water and to enable the removal of the acid gases in a subsequent gas scrubbing. Since a portion of the acid gases dissolves in the condensed water and forms an acid together with the latter, the apparatuses used for cooling the raw synthesis gas must be correspondingly expensively produced from an acid-resistant material.

In order to make efficient use of the heat contained in the raw synthesis gas, it is used according to prior art for, among other things, producing clean steam, which is typically delivered to an external consumer at a pressure of 5-100 bar as so-called export steam against credit. For this purpose, demineralized water (hereinafter referred to as DMW) is degassed and then heated indirectly at a pressure between 30 and 120 bar in a heat exchanger referred to as boiler feedwater preheater against the raw synthesis gas to be cooled from approximately 100° C. to just below its boiling temperature. After heating, the degassed DMW, which the person skilled in the art knows as boiler feedwater (short: BFW), evaporates into export steam in a steam drum.

A degasifier is used for degassing the DMW, which degasifier comprises a fractionating column arranged above a sump chamber. On its downward path, the DMW to be degassed and supplied to the top of the fractionating column that is operated at slight overpressure is brought into intensive contact with a countercurrent stripping steam, which is a relaxed part of the clean steam produced for export. As degassed DMW accumulates in the sump chamber of the degasifier, the stripping steam loaded in particular with oxygen, but also with other gases separated from the DMW, is withdrawn at the top of the column and disposed of into the atmosphere. The part of the clean steam branched off as stripping steam is thus lost and can no longer be efficiently used as export steam.

Typically, at least one additional heat exchanger is arranged downstream of the BFW preheater, in order to efficiently use low temperature heat of the raw synthesis gas by providing it, for example, to a heat consuming step within the process. However, the increased pressure loss in the flow path of the raw synthesis gas is disadvantageous. Given that the additional heat exchanger, like the BFW preheater, comes into contact with acidic condensate, it must also be expensively made of a material, such as stainless steel, which is sufficiently acid-resistant under operating conditions. Moreover, in order to avoid incorrect distributions of the raw synthesis gas on the exchange surfaces, the additional heat exchanger is arranged either at a lower level than the BFW preheater, so that sufficient pressure is available to be able to distribute the condensate in a controlled manner, or a condensate separator is arranged between the BFW preheater and the additional heat exchanger, which ensures that the exchange surfaces are only impinged upon by a gas phase. In both variants, long and expensive stainless steel lines are required, which impair the economic efficiency of synthesis gas or hydrogen production.

It is therefore the object of the present invention to provide methods and devices of the generic type, which are suitable for overcoming one or more of the disadvantages of the prior art.

From a method point of view, such object is achieved according to the invention in that the first fluid is cooled in at least two successive steps, between which heat for use in the heat-consuming process step is indirectly drawn from the second fluid.

As a result of the method according to the invention, a part of the heat contained in the first fluid larger than in the prior art can be supplied to an efficient use without an additional heat exchanger having to be integrated into the flow path of the first fluid.

A particularly advantageous variant of the method according to the invention provides for a chemically neutral second fluid to be used and for the heat intended for use in the heat-consuming process step to be transferred to a likewise chemically neutral medium. Here, a substance is to be considered chemically neutral if it is neither acidic nor alkaline, or at least significantly less aggressive than the acidic condensate formed from the first fluid, under the operating conditions of the process. Under such conditions, a heat exchanger can be used for the transfer of heat between the two media, which is produced inexpensively from a material which does not need to be acid-resistant or alkali-resistant.

The process according to the invention is preferably a synthesis gas generation in which a carbon-containing feedstock is thermochemically converted in order to obtain as an intermediate a hot raw synthesis gas containing acid gases and water vapor as first fluid, which is cooled against DMW as second fluid in order to obtain clean export steam.

Particularly preferably, heat is extracted from the DMW between the two steps of raw synthesis gas cooling, in order to use it for producing stripping steam which is used to degas DMW. For this purpose, heat is suitably drawn from the heated DMW via a heat exchanger referred to as intercooler which is arranged in the sump chamber of a degasifier operated at only slight overpressure and is indirectly transferred to already degassed DMW that has accumulated in the sump chamber, which vaporizes and rises upwards as stripping steam in a fractionating column (DMW fractionating column) that is arranged above the sump chamber. On the one hand, the DMW to be degassed is supplied to the column head and, on the other, the stripping steam loaded with separated gases is released into the atmosphere, while degassed DMW is drawn from the sump chamber, brought to pressure and used for cooling the raw synthesis gas.

According to the invention, the DMW can either be degassed before it is heated against raw synthesis gas or only after it has been stripped of heat in order to generate the stripping steam used for DMW degassing.

Usually, in the case of thermochemical synthesis gas generation, so-called process steam is generated from the condensate (process condensate) arising in the process, which, owing to its low purity, cannot be delivered to an external consumer and is therefore used in the process. Like the DMW, the process condensate must also be degassed before its evaporation, for which purpose it is treated with stripping steam at low overpressure in a separate fractionating column (PC fractionating column), which according to the prior art is likewise a relaxed part of the clean steam produced for export.

Further developing the method according to the invention, it is proposed, however, to draw heat from the DMW between the two steps, in order to cool the raw synthesis gas and to use such heat for producing stripping steam which is used in the degassing of the process condensate intended for process steam generation. For this purpose, heat is particularly preferably drawn from the DMW via the intercooler arranged in the sump chamber associated with the DMW fractionating column and transferred indirectly to already degassed DMW that has accumulated therein, which is evaporated in the process and transferred as stripping steam into the PC fractionating column.

Furthermore, the invention relates to a device for performing a process having at least one heat-consuming process step, comprising a cooling device by means of which a first fluid that arises in the process and contains acid gases and water vapor can be cooled indirectly against a second fluid thus forming an acidic condensate.

From a device point of view, the posed object is achieved according to the invention in that the cooling device comprises two cooling stages arranged in series and each of which allowing passage of the two fluids therethrough, between which a heat exchanger referred to as intercooler is arranged, via which heat can be indirectly drawn from the second fluid and supplied to the heat-consuming process step.

Preferably, the device according to the invention is suitable for performing a synthesis gas generation, in which a carbon-containing feedstock can be thermochemically converted in order to obtain as an intermediate a hot raw synthesis gas containing hydrogen, carbon monoxide, acid gases and water vapor as first fluid, which can be cooled against DMW as second fluid in the cooling device to obtain clean export steam.

Particularly preferably, the cooling device of the device according to the invention comprises a degasifier for degassing DMW intended for export steam production. The degasifier comprises a fractionating column (DMW fractionating column) arranged above a sump chamber, wherein the intercooler is arranged in the sump chamber of the degasifier so that degassed DMW accumulating in the sump chamber can be converted to stripping steam against the DMW to be cooled in the intercooler for the degassing of DMW.

The degasifier is expediently arranged in the flow path of the DMW in such a way that degassing of the DMW can be performed upstream of the cooling device. What is also feasible, however, is an arrangement where the DMW can be degassed downstream of the intercooler and upstream of the second cooling stage after heating in the first cooling stage.

The device according to the invention can also comprise a further degasifier with which condensate accumulating in the process can be degassed with the aid of stripping steam before it is further processed to process steam. In this case, a convenient refinement of the invention provides for a fluidic connection between the two degasifiers, so that DMW vapor produced according to the invention in the sump chamber of the DMW degasifier can be introduced as stripping steam into the fractionating column (PC fractionating column) of the condensate degasifier. The two degasifiers can each be designed as stand-alone apparatuses with fractionating column and sump chamber and connected only by a stripping steam line. What is also conceivable is a design where the two degasifiers are arranged above a sump chamber that can be used jointly, wherein the PC fractionating column has a chimney tray at its lower end, which prevents the ingress of degassed condensate that is not suitable for the generation of clean export steam into the sump chamber, but permits the passage of stripping steam from the sump chamber. The respective column internals can be arranged either in separate housings or in a common housing directly next to one another and separated from one another only by a planar wall. It is furthermore conceivable to arrange the internals of the PC fractionating column in a common housing directly above those of the DMW fractionating column, wherein a chimney tray closes off the PC fractionating column downwards in this variant as well.

In the following, the invention is to be explained in more detail based on three exemplary embodiments schematically illustrated in FIGS. 1 to 3.

FIG. 1 shows a process comprising a heat consuming process step in which a hot first fluid is cooled according to the invention.

Figure 2:
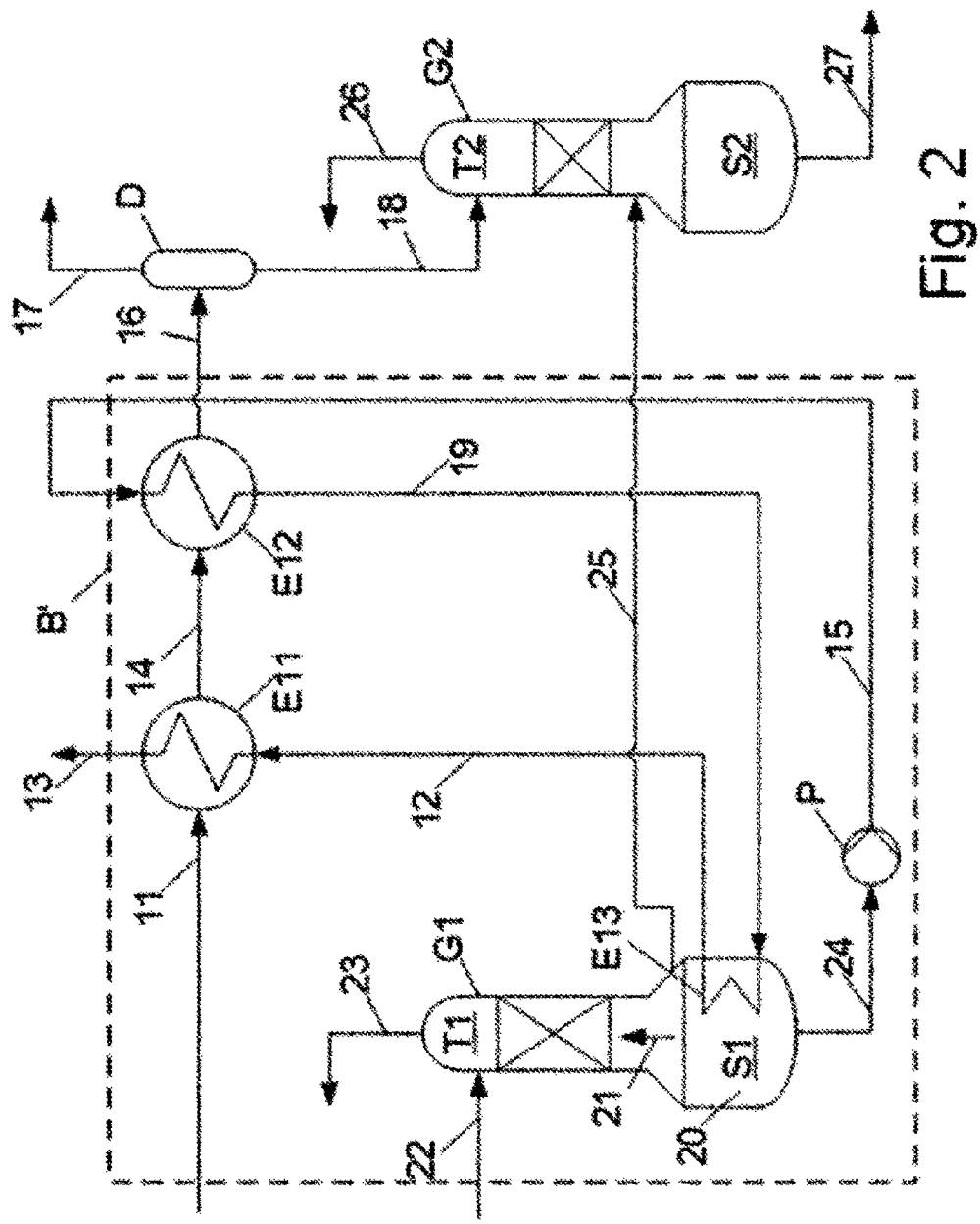
Figure 3:
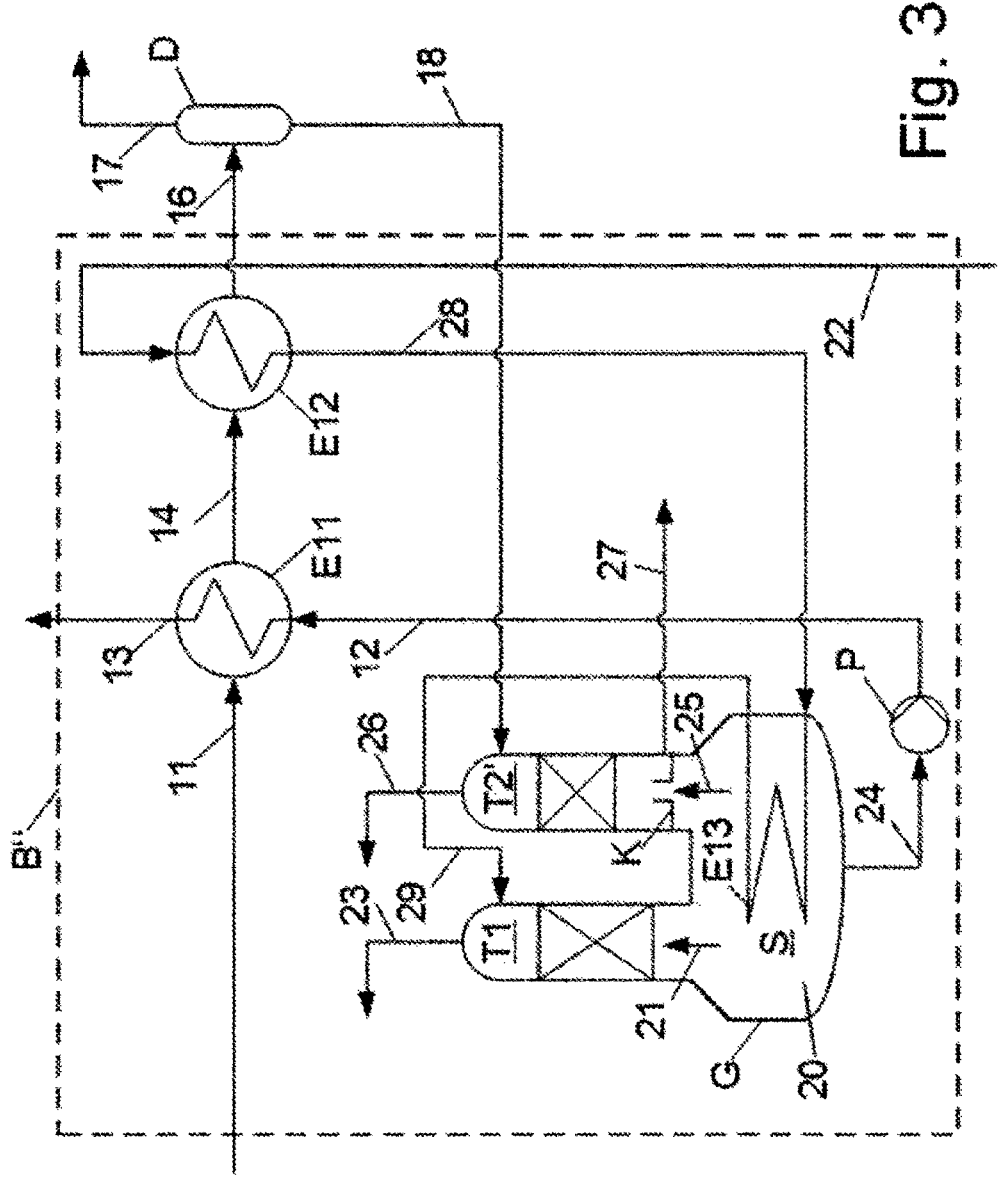

FIGS. 2 and 3 each show a section from a synthesis gas generation in which hot raw synthesis gas produced as an intermediate is cooled in accordance with the invention to produce stripping steam. In the two figures, identical system components and process flows are identified by the same reference numbers.

Process P in FIG. 1 is supplied via line 1 with a feedstock, from which, in process step A, a first fluid 2 containing acid gases and water vapor is obtained as an intermediate. In order to be able to condense water and subsequently to separate acid gases, the first fluid 2 is supplied to the cooling device B, where it is cooled indirectly against a second fluid 3 in a first cooling step in the heat exchanger E1. While the second fluid exits the heat exchanger E1 heated via line 4 and is conditioned, for example, into a product 5 in process step C, the cooled first fluid 6 is passed into the heat exchanger E2, where it is cooled to below the water dew point against the first second fluid supplied cold via line 7 from the outside. In the condensate obtained, a portion of the acid gases dissolves, so that via line 8 an acidic two-phase mixture of substances leaves the heat exchanger E2 which is passed on to process step D, where product 9 is obtained in particular by removing water and acid gases. In the intercooler E3, heat which is used in the heat-consuming process step V is drawn from the second fluid 10 that has been heated in the heat exchanger E2. For renewed heating, the second fluid cooled in intercooler E3 is supplied to heat exchanger E1 via line 3.

In FIG. 2, hot raw synthesis gas containing water and acid gases is supplied to a first heat exchanger E11 at a temperature between 370 and 150° C. via line 11, where in a first step it is cooled indirectly against degassed DMW 12 to a temperature between 300 and 120° C. While the degassed DMW 13 exits the heat exchanger E11 at a temperature just below its boiling temperature in order to be subsequently evaporated to export steam in a steam drum (not shown), energy is further drawn from the raw synthesis gas 14, which has been cooled in the first step, in a second heat exchanger E12 against also degassed DMW 15, wherein water is condensed and a two-phase mixture of substances 16 is obtained, which in the separating device D is separated into a largely anhydrous synthesis gas 17 and acidic process condensate 18. The degassed DMW 19 heated in the second heat exchanger E12 against the raw synthesis gas 14 releases part of its heat via the intercooler E13 again before it is supplied to the first heat exchanger E11 via line 12. The intercooler E13 embodied as an evaporator is arranged in the sump chamber S1 of the DMW degasifier G1 operated at low overpressure and surrounded by already degassed DMW 20, from which stripping steam is produced as a result of the heat supplied. One part 21 of the stripping steam rises upwards in the fractionating column T1 of the DMW degasifier G1 arranged above the sump chamber S1 and is brought into intensive contact with the DMW 22 supplied to the top of the DMW fractionating column T1, which is degassed in the process. The stripping steam 23 loaded with the gases separated from the DMW 22 is withdrawn from the top of the DMW fractionating column T1 and supplied to disposal (not shown), while the degassed DMW is withdrawn via line 24 from the sump S1 of the DMW degasifier and, after increasing the pressure in the pump P, is supplied to the second heat exchanger E12 as coolant 15.

The process condensate 18 is also degassed, for which purpose it is charged via the top of the fractionating column T2 of the PC degasifier G2, in which it flows downwards and is brought into intensive contact with stripping steam supplied via line 25 from the sump S1 of the DMW degasifier G1. As the stripping steam 26 loaded with the gases separated from the process condensate 18 is withdrawn from the top of the PC fractionating column T2 for disposal, degassed condensate 27 can be withdrawn from the sump S2 of the PC degasifier G2 and subsequently converted to process steam (not shown).

In FIG. 3, DMW 22 is first heated in the heat exchanger E12 against the raw synthesis gas 14 already cooled in a first step in the heat exchanger E11 before it is supplied to the intercooler E13 via line 28 to deliver heat. The intercooler E13 embodied as an evaporator is arranged in the sump chamber S of the degasifier G operated at low overpressure and surrounded by degassed DMW 20, from which stripping steam is produced by the heat supplied via the DMW 28. A first part 21 of the stripping steam rises upwards in the DMW fractionating column T1 arranged above the sump chamber S, at the top of which the DMW 29 cooled in the intercooler E13 is fed in order to be degassed on its way downwards by means of the stripping steam 21. The stripping steam 21 loaded with the gases separated from the DMW 29 is withdrawn from the top of the DMW fractionating column T1 and supplied to disposal (not shown).

For its degassing, the process condensate 18 is supplied via the top of the PC fractionating column T2', which is likewise arranged above the sump chamber S of the degasifier G. On its way down, the process condensate is brought into intensive contact with stripping steam 25, which flows upwards through the chimney tray K from the sump chamber S. While the stripping steam 26 loaded with the gases separated from the process condensate 18 is discharged from the top of the PC fractionating column T2' for disposal, condensate 27 can be withdrawn from the chimney tray K in a degassed manner and subsequently converted to process steam (not shown).

The invention claimed is:

1. A method for performing a process comprising:
   at least one heat-consuming process step, wherein a first fluid, which arises in the process and contains acid gases and water vapor, is cooled indirectly against a second fluid thus forming an acidic condensate,
   wherein the indirect cooling of the first fluid is performed in at least two successive steps, between which heat for use in the at least one heat-consuming process step is indirectly withdrawn from the second fluid.

2. The method according to claim 1, wherein a chemically neutral fluid is used as said second fluid and heat intended for use in the at least one heat-consuming process step is transferred to a chemically neutral medium.

3. The method according to claim 1, wherein the process is a synthesis gas generation process in which a carbon-containing feedstock is thermochemically converted, in order to obtain a raw synthesis gas containing water vapor and acid gases as said first fluid, which is cooled in the at least one heat-consuming process step against demineralized water as said second fluid to obtain export steam.

4. The method according to claim 3, wherein, in the at least one heat-consuming process step, heat is withdrawn from the demineralized water between said at least two successive steps for cooling said first fluid, and the heat withdrawn from the demineralized water is used to produce stripping steam, which is used for degassing demineralized water.

5. The method according to claim 3, wherein, in the at least one heat-consuming process step, heat is withdrawn from the demineralized water between said at least two successive steps for cooling the first fluid, and the heat withdrawn from the demineralized water is used to produce stripping steam which is used for degassing process condensate.

6. The method according to claim 3, wherein, in the at least one heat-consuming process step, heat is withdrawn from the demineralized water between said at least two successive steps for cooling said first fluid, and the heat withdrawn from the demineralized water is used to produce stripping steam, which is used for degassing demineralized water and for degassing of process condensate.

7. The method according to claim 3, wherein, in the at least one heat-consuming process step, heat is withdrawn from the demineralized water in an intercooler between said at least two successive steps for cooling said first fluid, wherein the intercooler is arranged in a sump chamber of a degasifier for degassing mineralized water, so that degassed demineralized water accumulating in the sump chamber can be converted into stripping steam by heat exchange with the demineralized water to be cooled in the intercooler, and said stripping steam is used for degassing demineralized water in said gasifier.

8. The method according to claim 3, wherein, in the at least one heat-consuming process step, heat is withdrawn from the demineralized water in an intercooler between said at least two successive steps for cooling said first fluid, wherein the intercooler is arranged in a sump chamber of a degasifier for degassing mineralized water, and degassed demineralized water accumulating in the sump chamber can be converted into stripping steam and at least part of the stripping steam is used for degassing of process condensate.

9. The method according to claim 3, wherein, in the at least one heat-consuming process step, heat is withdrawn from the demineralized water in an intercooler between said at least two successive steps for cooling said first fluid, wherein the intercooler is arranged in a sump chamber of a degasifier for degassing mineralized water, so that degassed demineralized water accumulating in the sump chamber can be converted into stripping steam by heat exchange with the demineralized water to be cooled in the intercooler, and at least part of the stripping steam is used for degassing process condensate.

10. A device for performing a process comprising at least one heat-consuming process step (F), said device comprising:
   a cooling device by means of which a first fluid that arises in the process and contains acid gases and water vapor can be cooled indirectly against a second fluid thus forming an acidic condensate wherein the cooling device comprises two cooling stages arranged in series and each of which allowing passage of the first and second fluids therethrough, between which a heat exchanger, referred to as an intercooler, is arranged, via which heat can be indirectly drawn from the second fluid and supplied to the at least one heat-consuming process step.

11. The device according to claim 10, wherein said device is suitable for performing a synthesis gas generation, in which a carbon-containing feedstock can be thermochemically converted in order to obtain as said first fluid a raw synthesis gas containing the acid gases and water vapor, which said first fluid can be cooled against demineralized water as said second fluid in the cooling device to obtain export steam from the at least one heat-consuming process step.

12. The device according to claim 11, wherein the cooling device further comprises a degasifier for degassing demineralized water provided for export steam production, wherein the intercooler is arranged in a sump chamber of the degasifier, so that degassed demineralized water accumulating in the sump chamber can be converted against the demineralized water to be cooled in the intercooler into stripping steam for degassing the demineralized water for export steam production.

13. The device according to claim 11, further comprising a fractionating column by means of which the acidic condensate formed during cooling of the raw synthesis gas can be degassed using stripping steam before the acidic condensate is further processed to process steam, wherein the fractionating column is fluidically connected to a sump chamber of a degasifier, so that demineralized water vapor generated in the sump chamber from degassed demineralized water can be introduced as the stripping steam into the fractionating column.

14. The device according to claim 11, wherein the cooling device further comprises a degasifier for degassing demineralized water, said degasifier comprising a sump chamber and a fractionating column for degassing the acidic condensate formed during cooling of the raw synthesis gas, wherein the intercooler is arranged in said sump chamber of the degasifier, and wherein degassed demineralized water accumulating in the sump chamber is heated, by heat exchange against the demineralized water to be cooled in the intercooler, and converted into stripping steam which is used for degassing demineralized water and for degassing the acidic condensate.

* * * * *